United States Patent
Kawabuchi et al.

(10) Patent No.: US 7,926,370 B2
(45) Date of Patent: Apr. 19, 2011

(54) ROTATION AND EXTENSION/RETRACTION LINK MECHANISM

(75) Inventors: Ichiro Kawabuchi, Tokyo (JP); Susumu Tachi, Tsukuba (JP); Naoaki Kawakami, Tottori (JP)

(73) Assignee: Ichiro Kawabuchi, Tokyo (JP)

( * ) Notice: Subject to any disclaimer, the term of this patent is extended or adjusted under 35 U.S.C. 154(b) by 983 days.

(21) Appl. No.: 10/596,628

(22) PCT Filed: Dec. 17, 2004

(86) PCT No.: PCT/JP2004/018952
§ 371 (c)(1), (2), (4) Date: Apr. 10, 2007

(87) PCT Pub. No.: WO2005/059407
PCT Pub. Date: Jun. 30, 2005

(65) Prior Publication Data
US 2007/0193398 A1    Aug. 23, 2007

(30) Foreign Application Priority Data
Dec. 18, 2003  (JP) .................................. 2003-421716

(51) Int. Cl.
*F16H 21/00*   (2006.01)
(52) U.S. Cl. .......................... 74/22 R; 414/739; 901/39
(58) Field of Classification Search ............... 74/422, 74/435, 490.01, 490.05, 490.06; 16/354, 16/357, 361, 362, 364, 368, 369, 370; 294/106; 414/739; 901/27, 28, 29, 31, 39; 403/104, 403/105, 107
See application file for complete search history.

(56) References Cited

U.S. PATENT DOCUMENTS

| | | | | |
|---|---|---|---|---|
| 2,078,815 A | * | 4/1937 | Segar | 16/286 |
| 2,959,808 A | * | 11/1960 | Limberg | 16/354 |
| 4,979,265 A | * | 12/1990 | Grass | 16/291 |
| 5,102,084 A | * | 4/1992 | Park | 248/286.1 |
| 5,500,985 A | * | 3/1996 | Klueger | 16/354 |
| 6,296,217 B1 | | 10/2001 | Ikedo et al. | |
| 6,662,405 B2 | * | 12/2003 | Vitry | 16/355 |
| 6,926,363 B2 | * | 8/2005 | Yamashita | 297/366 |

FOREIGN PATENT DOCUMENTS

| | | |
|---|---|---|
| JP | 63-050967 | 3/1988 |
| JP | 2003-117873 | 4/2003 |
| JP | 2003-175484 | 6/2003 |
| JP | 2003-224375 | 8/2003 |
| JP | 2004-112056 | 4/2004 |

* cited by examiner

*Primary Examiner* — Richard W Ridley
*Assistant Examiner* — Alan B Waits
(74) *Attorney, Agent, or Firm* — Benesch Friedlander Coplan & Aronoff, LLP

(57) ABSTRACT

A rotation and extension/retraction link mechanism which realizes a rotary joint having a virtual rotation axis is provided. A rotation and extension/retraction link mechanism 1 is configured so that a first link 5 having a first virtual center line 3 and a second link 9 having a second virtual center line 7 are coupled through a rotation and extension/retraction joint mechanism 11. The rotation and extension/retraction joint mechanism 11 is configured to couple the first link 5 and the second link 9 so that when the second virtual center line 7 rotates relative to the first virtual center line 3 from a state where the first virtual center line 3 entirely overlaps with the second virtual center line 7, while crossing the first virtual center line 3, an intersection between the first virtual center line 3 and the second virtual center line 7 is displaced on the first virtual center line 3 by a predetermined distance corresponding to an angle of the rotation.

16 Claims, 7 Drawing Sheets

ROTATION AND EXTENSION/RETRACTION LINK MECHANISM

TECHNICAL FIELD

The present invention relates to a rotation and extension/retraction link mechanism having a rotation and extension/retraction joint mechanism.

BACKGROUND ART

As disclosed in Japanese Patent Application Laid-Open Publication No. 117873/2003 and Japanese Patent Application Laid-Open Publication No. 175484/2003, as a conventional mechanism used for a robot arm or the like, a link mechanism which rotates two links through a rotary joint mechanism having a real axis of rotation is known.
Patent Document 1: Japanese Patent Application Laid-Open Publication No. 117873/2003
Patent Document 2: Japanese Patent Application Laid-Open Publication No. 175484/2003

DISCLOSURE OF THE INVENTION

Problem to be Solved by the InventioN

However, in a mechanism in which two links rotate relative to each other, there is an application that needs a space in the vicinity of a center of rotation between both links, To such an application, the conventional rotary joint mechanism having the real axis of rotation cannot be applied. When the conventional link mechanism is to be moved in accordance with a movement of a human body (herein a finger) as shown in FIG. 9, for example, the following problem arises. First, when the conventional link mechanism is arranged above the finger as shown in a drawing at a top of FIG. 9 (that is, the conventional link mechanism is arranged so that an axis of rotation of the finger becomes parallel to the axis of rotation of the link mechanism), the link mechanism will come into collision with the finger as a rotation angle of a finger joint increases. A movable angle larger than approximately 45 degrees therefore cannot be obtained. When the conventional link mechanism is arranged on a side of the finger (that is, the conventional link mechanism is arranged so that a position of the axis of rotation of the human body coincides with a position of the axis of rotation of the conventional link mechanism), the finger and the link mechanism can make the same movement. However, the link mechanism is present on an extension of the axis of the joint. Thus, the link mechanism cannot be applied to a human body (such as a middle finger of a hand) for which an arrangement space of the link mechanism does not exist.

An object of the present invention is to provide a rotation and extension/retraction link mechanism in which two links can rotate and can also extend/retract.

An object of the present invention is to provide a rotation and extension/retraction link mechanism that realizes a rotary joint having a virtual axis of rotation.

Other object of the present invention is to provide a rotation and extension/retraction link mechanism that can be arranged even in a narrow space.

Still other object of the present invention is to provide a rotation and extension/retraction link mechanism that can be constructed with a small number of components.

Means for Solving the Problem

A rotation and extension/retraction link mechanism of the present invention is constructed by coupling or connecting of a first link having a first virtual center line and a second link having a second virtual center link through a rotation and extension/retraction joint mechanism. Herein, the first link and the second link are members that are constrained by the rotation extension/retraction joint mechanism in the rotation and extension/retraction link mechanism, which will be described later in detail. The first link and the second link are the members coupled to each other through the rotation and extension/retraction joint mechanism, and operate in conjunction with each other. The first virtual center line and the second virtual center line mean the center lines assumed to be located inside the first link and the second link, respectively. The first virtual center line and the second virtual center line can entirely overlap with each other. In a state where the first link and the second link are orthogonal to each other, these center lines are also orthogonal to each other.

In the present invention, the rotation and extension/retraction joint mechanism is constructed to couple the first link and the second link in such a manner that when the second virtual center line rotates relative to the first virtual center line from a state where the first virtual center line entirely overlaps with the second virtual center line, while the second virtual center line is crossing the first virtual center line, an intersection between the first virtual center line and the second virtual center line moves on the first virtual center line by a predetermined distance corresponding to an angle of the rotation. Herein, the intersection between the first virtual center line and the second virtual center line means a point at which the first virtual center line and the second virtual center line cross each other when the first link and the second link operate in conjunction with each other. Movement on the first virtual center line just by the predetermined distance corresponding to the angle of the rotation means that the intersection moves the predetermined distance on the first virtual center line when the second link rotates relative to the first link. When the rotation and extension/retraction link mechanism as described above is adopted, the first and second links can mutually make rotation movements about respective virtual axes of rotation therefor at which no real structural members are present, through the rotation and extension/retraction joint mechanism.

The first link includes first and second opposing wall portions facing each other at a predetermined spacing, and the second link includes a first opposed wall portion facing the first opposing wall portion and a second opposed wall portion facing the second opposing wall portion. Then, the rotation and extension/retraction joint mechanism includes a first rack gear provided at the first opposed wall portion and extending along the second virtual center line; a first sector gear including a plurality of cogs or teeth to be engaged with the second rack gear, the first sector gear being slidably supported by the first opposing wall portion so that the first sector gear rolls on the first rack gear and slides along the first virtual center line; a second rack gear provided at the second opposing wall portion and extending along the first virtual center line; and a second sector gear including a plurality of cogs to be engaged with the second rack gear, the second sector gear being slidably supported by the second opposed wall portion so that the second sector gear rolls on the second rack gear and slides along the second virtual center line. The first sector gear slidably supported by the first opposing wall portion of the first link rolls on the first rack gear configured to be integral with the first opposed wall portion of the second link, through the cogs. Then, the second sector gear slidably supported by the second opposed wall portion of the second link rolls on the second rack gear configured to be integral with the second opposing wall portion of the first link, through the cogs. Accordingly, stiffness can be given to movements of the first and second links.

In the present invention, shapes and sizes of the first rack gear and the first sector gear and a positional relationship therebetween, and shapes and sizes of the second rack gear and the second sector gear and a positional relationship therebetween are determined so that, as viewed in projection perpendicular to a virtual plane in which the first virtual center line and said second virtual line are both present, a first relative rotation amount of the first sector gear relative to the first rack gear becomes equal to a second relative rotation amount of the second sector gear relative to the second rack gear, a first relative rotation direction of the first sector gear relative to the first rack gear becomes opposite to a second relative rotation direction of the second sector gear relative to the second rack gear, a first sliding amount of the first sector gear along the first virtual center line becomes equal to a second sliding amount of the second sector gear along the second virtual center line, and a first sliding direction of the first sector gear along the first virtual center line becomes relatively opposite to a second sliding direction of the second sector gear along the second virtual center line.

Herein, the virtual plane where the first and second virtual center lines are both present means the plane where the first and second virtual center lines can be both present in a mutually crossed state. When the shapes and the sizes of the first rack gear and the second sector gear and the positional relationship therebetween and the shapes and the sizes of the second rack gear and the second sector gear and the positional relationship therebetween are determined as described above, a rotation movement and an extension/retraction movement of the second link relative to the first link can be uniquely determined.

Shapes and sizes of the first rack gear and the first sector gear and a positional relationship therebetween, and shapes and sizes of the second rack gear and the second sector gear and a positional relationship therebetween are determined so that a minimum distance between a center of rotation of the second virtual center line and the first virtual center line and a minimum distance between the center of rotation and the second virtual center line always become substantially constant. The center of rotation is defined in the virtual plane when the second virtual center line relatively rotates with respect to the first virtual center line. When a movement of an object on a plane can be regarded as a rotation movement around a certain point, the certain point is generally defined to be the center of rotation. Assume that this definition is applied to this case. Then, when the minimum distance between the second virtual center line and a certain point is constant while the second virtual center line makes a movement, it means that the second virtual center line makes the rotation movement using the center point as the center of rotation.

The rotation and extension/retraction link mechanism of the present invention further includes a driving force applying mechanism which generates at least one driving force among a driving force that causes the first sector gear to roll relative to the first rack gear, a driving force that causes the first sector gear to linearly move along the virtual center line, a driving force that causes the second sector gear to roll relative to the second rack gear, and a driving force that causes the second sector gear to linearly move along the second virtual center line. By this driving force applying mechanism, the rotation and extension/retraction link mechanism can be driven.

Specifically, the driving force applying mechanism includes a common shaft with an axis line thereof located at an intersection between the first virtual center line and the second virtual center line, the common shaft vertically extending with respect to the virtual plane and also rotatably passing through the first sector gear and the second sector gear; a driving rope passing over a pulley supported by the common shaft and extending both along the first virtual center line and the second virtual center line; a rope winding device which winds up the driving rope; and a rope tension generating mechanism which adjustably generates tension of the driving rope. A leading end of the driving rope pulled out from the rope winding device is fixed to one of the first link and the second link. The driving rope is wound up by the rope winding device and the tension is given by the rope tension output generating mechanism, thereby allowing generation of both the driving force that causes the first sector gear to linearly move along the first virtual center line and the driving force that causes the second sector gear to linearly move along the second virtual center line.

In the driving force applying mechanism including the rope tension generating mechanism described above, the driving rope cannot be pulled out unless an external force works. Then, a return mechanism which always generates a force for relatively rotating the first virtual center line and the second virtual center line is provided between the first link and the second link. When the return mechanism as described above is provided, the return mechanism can give tension necessary for winding up or pulling out the driving rope to the driving rope, and can further prevent a deflection of the driving rope. Accordingly, rigidity can be given to the rotation and extension/retraction link mechanism.

It may be so configured that the second link is located between the first opposing wall portion and the second opposing wall portion. Specifically, it may be so configured that the first opposed wall portion of the second link and second opposed wall portion of the second link are arranged with a predetermined spacing and that the first link and the second link are assembled to alternate with each other in such a manner that the first opposing wall portion, the first opposed wall portion, the second opposed wall portion, and the second opposing wall portion are arranged in order. With this arrangement, the rotation and extension/retraction link mechanism can be constructed with a small number of components and also compactly. Accordingly, reduction in size and cost of the rotation and extension/retraction link mechanism can be effected As an alternative arrangement of the first link and the second link in which the first opposed wall portion of the second link and the second opposed wall portion of the second link are arranged at the predetermined spacing, the first opposing wall portion, the first opposed wall portion, the second opposing wall portion, and the second opposed wall portion may be arranged in order. Even with this arrangement, the rotation and extension/retraction link mechanism can be constructed with a small number of components and also compactly.

Sliding projecting portions are provided at one of the first sector gear and the first opposing wall portion and one of the second sector gear and the second opposed wall portion, respectively, and sliding recess portions to be slidably fit into the sliding projecting portions are provided at the other of the first sector gear and the first opposing wall portion and the other of the second sector gear and the second opposed wall portion, respectively. Since the sliding projecting portions are fit into the sliding recess portions, dimensions of each sliding projecting portion becomes slightly smaller than dimensions of each sliding recess portion. The sliding recess portions may be the ones that allow sliding with the sliding projecting portions fit thereinto. Accordingly, the sliding recess portions may pass through the other of the first sector gear and the first opposing wall portion and the other of the second sector gear and the second opposed wall portion, or not. The sliding projecting portions are fit into the sliding recess portions, for sliding. The first link can thereby make an extension/retraction movement relative to the second link, while the second link can make an extension/retraction movement relative to the first link. By adding a rotation movement to the above movement, a rotation movement and extension/retraction movement of the rotation extension/retraction link mechanism of the present invention can be realized.

At least one of the opposing wall portions of the first link and the opposed wall portions of the second link is constructed so that a length thereof in a direction of the corresponding virtual center line can be mechanically adjusted. In order to enable the mechanical adjustment, the link can be constituted from two divided links connected through a sliding mechanism which allows the two divided links to slide in directions of the virtual center lines, and a fixing structure for fixing the two divided links and the sliding mechanism. As the fixing structure, a screw member or the like can be employed. When the length of the link can be mechanically adjusted as described above, the length of the link can be set according to an application. Accordingly, a need for preparing a lot of types of the links is eliminated, so that general versatility is enhanced.

Alternatively, by providing a screw member within each of the sliding recess portions, sliding distances of the sliding projecting portions within the sliding recess portions may be limited. With this arrangement, even when a movable range of the rotation and extension/retraction link mechanism is to be adjusted, there is no need for replacing a component therein.

The rotation and extension/retraction joint mechanism includes: a first rack gear provided at the first opposed wall portion and extending along the second virtual center line; a first sector gear slidably supported by the first opposing wall portion so that the first sector gear slides along the first virtual center line; a first reversing gear located between the first rack gear and the first sector gear, the first reversing gear being engaged with both of the first rack gear and the first sector, for rotation; a second rack gear provided at the second opposing wall portion and extending the first virtual center line; a second sector gear slidably supported by the second opposed wall portion so that the second sector gear slides along the second virtual center line; and a second reversing gear located between the second rack gear and the second sector gear, the second reversing gear being engaged with both of the second rack gear and the second sector gear, for rotation. By adopting the rotation and extension/retraction link mechanism that uses the first and second reversing gears as described above, the first and second rack gears and the first and second sector gears can be greatly separated from the center of rotation of the second virtual center line relative to the first virtual center line. A larger space in the vicinity of the center of rotation can be obtained.

In the rotation and extension/retraction link mechanism of the present invention, shapes and sizes of the first rack gear, the first sector gear, and the first reversing gear and a positional relationship thereamong, and shapes and sizes of the second rack gear, the second sector gear, and the second reversing gear and a positional relationship thereamong are determined so that, as viewed in projection perpendicular to a virtual plane in which the first virtual center line and said second virtual line are both present, a first relative rotation amount of the first sector gear relative to the first rack gear becomes equal to a second relative rotation amount of the second sector gear relative to the second rack gear, a first relative rotation direction of the first sector gear relative to the first rack gear becomes opposite to a second relative rotation direction of the second sector gear relative to the second rack gear, a first sliding amount of the first sector gear along the first virtual center line becomes equal to a second sliding amount of the second sector gear along the second virtual center line, and a first sliding direction of the first sector gear along the first virtual center line becomes relatively opposite to a second sliding direction of the second sector gear along the second virtual center line. When the shapes and the sizes of the first rack gear, first sector gear, and first reversing gear and the positional relationship thereamong and the shapes and the sizes of the second rack gear, second sector gear, and second reversing gear and the positional relationship thereamong are determined as described above, a rolling movement and an extension/retraction movement of the second link relative to the first link can be uniquely determined, even if the configuration that uses the first and second reversing gears is employed.

In this case, the rotation and extension/retraction link mechanism of the present invention may further include a driving force applying mechanism which generates at least one driving force among a driving force that causes the first sector gear to roll relative to the first rack gear, a driving force that causes the first sector gear to linearly move along the first virtual center line, a driving that causes the second sector gear to roll relative to the second rack gear, and a driving force that causes said the sector gear to linearly move along the second virtual center line. With this arrangement, the rotation and extension/retraction link mechanism can be driven even if the first and second reversing gears are employed.

Further, by connecting a plurality of the rotation and extension/retraction link mechanisms of the present invention in series, a serial multi-joint mechanism can be formed. By adopting the serial multi-joint mechanism as described above, a complex operation can be therefore implemented since the rotation and extension/retraction link mechanisms are included.

In this serial multi-joint mechanism, when the driving ropes added for driving the driving rotation and extension/retraction joint mechanisms are pulled around one or more pulleys within one or more rotation and extension/retraction joint mechanisms which are present between the rope winding device that winds up or unwinds the driving rope and the rope tension output generating mechanism and one of the rotation and extension/retraction joint mechanisms, movements of the individual rotation and extraction/retraction mechanisms can be adjusted. Accordingly, a more complex operation can be implemented.

BEST MODE FOR CARRYING OUT THE INVENTION

Figure 1:
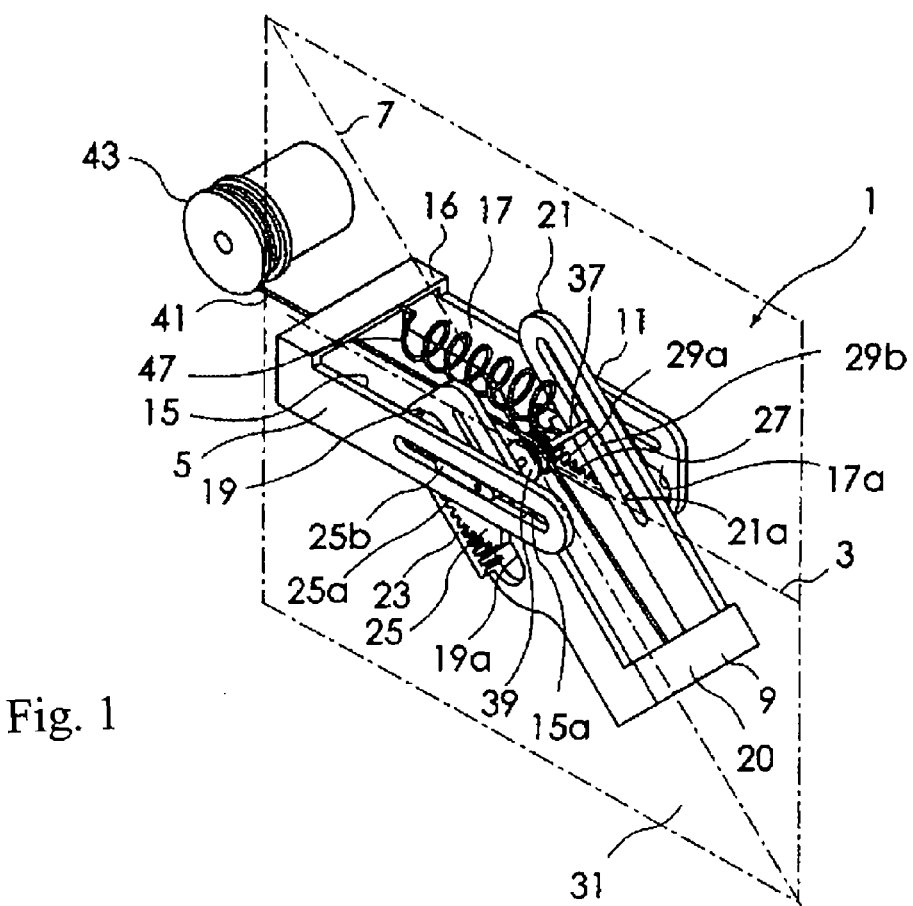
FIG. 1 is a perspective view showing a configuration of a rotation and extension/retraction link mechanism according to an embodiment of the present invention.
Figure 2A:
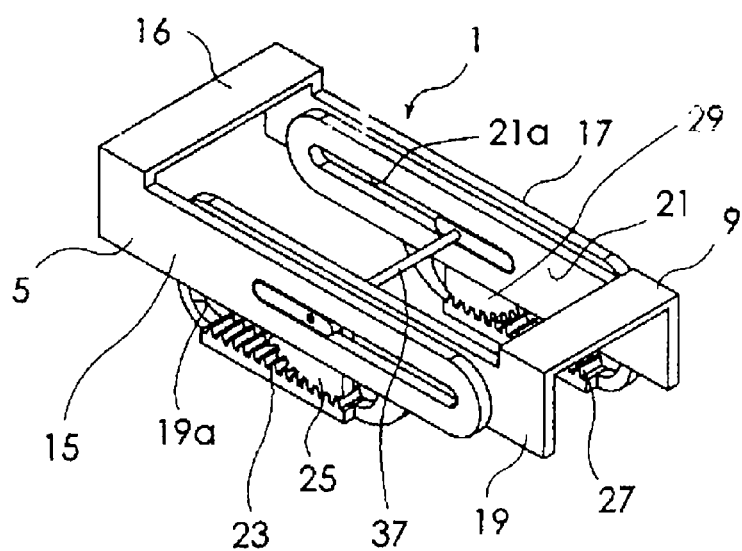
FIG. 2A is a perspective view showing a configuration of a main portion of the rotation and extension/retraction link mechanism in the embodiment of the present invention in a state before the rotation and extension/retraction link mechanism makes a rotation movement.
Figure 2B:
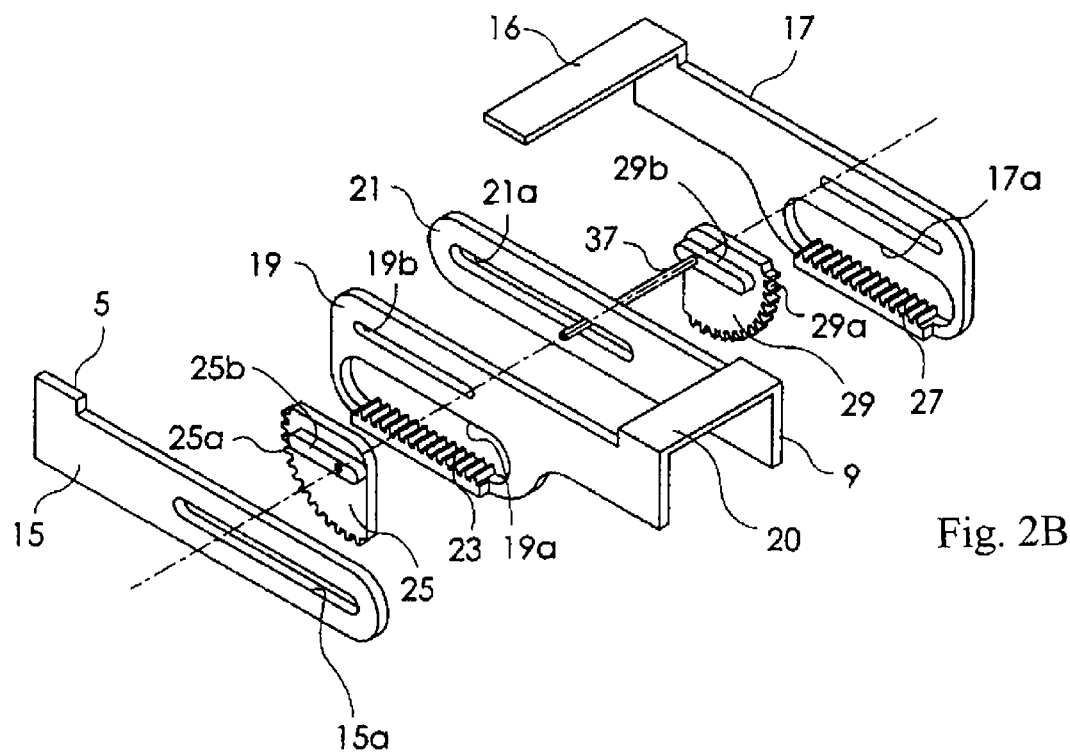
FIG. 2B is an exploded perspective view of FIG. 2A.
Figure 2C:
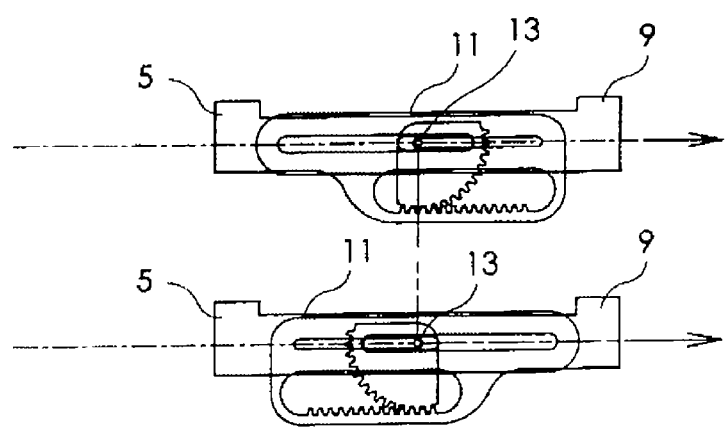
FIG. 2C is a diagram used for explaining an operation of the embodiment in FIG. 2A.
Figure 3:
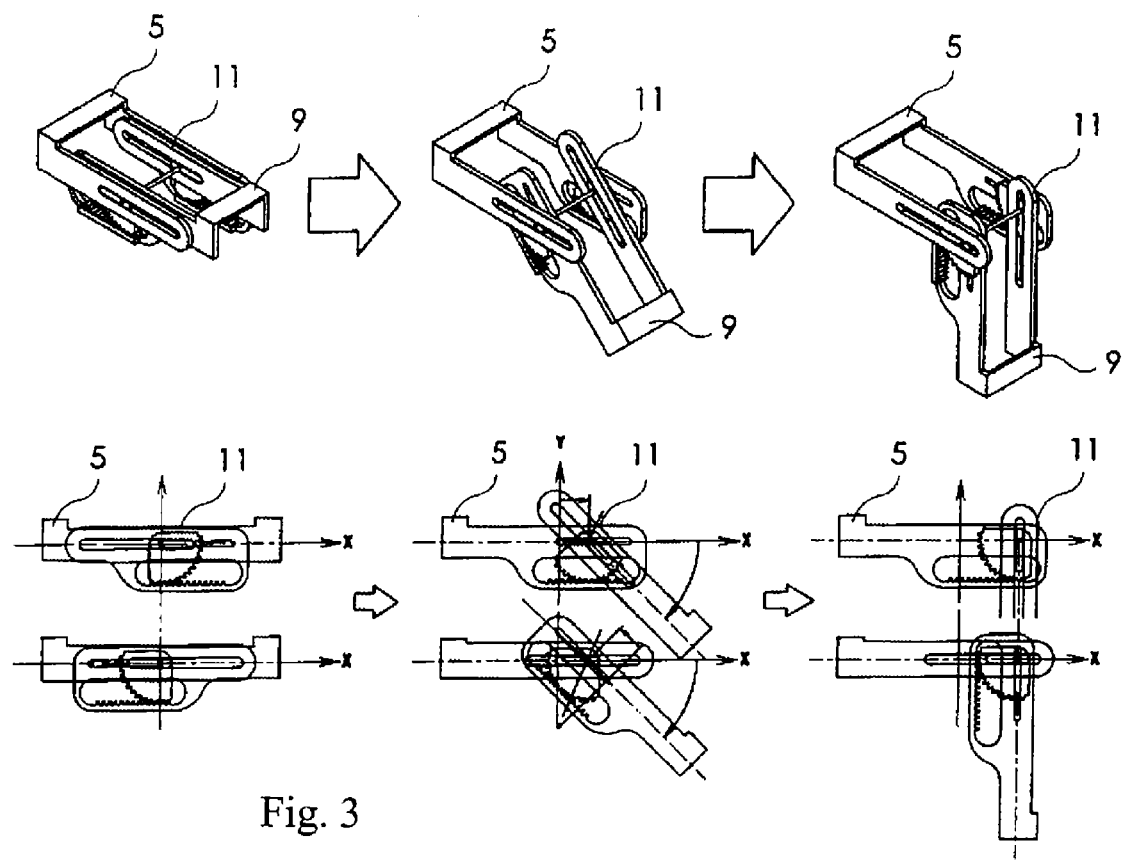
FIG. 3 shows a perspective view and a plan view illustrating driven states of the embodiment shown in FIG. 2A.

Embodiments of the present invention will be described below in detail with reference to drawings. FIG. 1 is a perspective view showing a configuration of a rotation and extension/retraction link mechanism according to an embodiment of the present invention. FIG. 2A is a perspective view showing a configuration of a main portion of the rotation and extraction/retraction link mechanism in the embodiment of the present invention in a state before the rotation and extension/retraction link mechanism makes a rotation movement. FIG. 2B is an exploded perspective view of FIG. 2A, and FIG. 2C is a diagram used for explaining an operation in the embodiment in FIG. 2A. FIG. 3 shows a perspective view and a plan view showing driven states of the embodiment shown in FIG. 2A. Referring to these drawings, reference numeral 1 indicates the rotation and extension/retraction link mechanism in the embodiment of the present invention. This rotation and extension/retraction link mechanism 1 is constructed so that a first link 5 having a first virtual center line 3 and a second link 9 having a second virtual center line 7 are coupled through a rotation and extension/retraction joint mechanism 11 that will be described later in detail. The first link 5 and the second link 9 are members that are constrained by the rotation extension/retraction joint mechanism 11, coupled to each other through the rotation and extension/retraction joint mechanism 11, and operate in conjunction with each other. While the first link 5 and the second link 9 are formed from a metal material, these may be formed from a plastic material having durability. The first virtual center line 3 and the second virtual center line 7 mean the center lines assumed to be located inside the first link 5 and the second link 9, respectively. Specifically, when the first link 5 and the second link 9 entirely overlap with each other, these center lines entirely overlap with each other as well. When the first link 5 and the second link 9 are orthogonal to each other, these center lines are orthogonal to each other as well.

In this rotation and extension/retraction link mechanism 1, when the second virtual center line 7 of the second link 9 rotates relative to the first virtual center line 3 of the first link 5 from a state in which the first virtual center line 3 entirely overlaps with the second virtual center line 7, while the second virtual center line 7 is crossing the first virtual center line 3, an intersection 13 between the first virtual center line 3 and the second virtual center line 7 moves. That is, the rotation and extension/retraction link mechanism 1 is configured to couple the first link 5 and the second link 9 in such a manner that the second link 9 rotates relative to the first link 5 while this intersection 13 moves on the first virtual center line 3 just by a predetermined distance according to a rotation angle of the second link 9. Herein, the intersection 13 between the first virtual center line 3 and the second virtual center line 7 means a point at which the first virtual center line 3 and the second virtual center line 7 cross each other when the first link 5 and the second link 9 operate in conjunction with each other. In this case, when the second link 9 rotates relative to the first link 5, the intersection 13 moves on the first virtual center line 3 just by the predetermined distance corresponding to the rotation angle of the second link. Alternatively, in the embodiment of the present invention, through the rotation and extension/retraction joint mechanism 11, the first link 5 and the second link 9 mutually rotate about respective virtual axes of rotation (virtual centers of rotation) for which no real structural members are present.

The first link 5 has a first opposing wall section 15 and a second opposing wall section 17 that face each other at a predetermined spacing. The first opposing wall section 15 and the second opposing wall portion 17 become a single-piece construction coupled by a coupling wall portion 16 on ends thereof opposite to a side where the first opposing wall section 15 and the second opposing portion 17 come into contact with the second link 9. The second link 9 includes a first opposed wall portion 19 and a second opposed wall portion 21 corresponding to the first opposing wall portion 15 and the second opposing wall portion 17, respectively. The first opposed wall portion 19 and the second opposed wall portion 21 become a single-piece construction coupled by a coupling wall portion 20 on ends thereof opposite to a side where the first opposed wall portion 19 and the second opposed portion 21 come into contact with the first link 5. That is, the first link 5 and the second link 9 are almost substantially of the same shape except for a difference in positions of a first rack gear 23 and a second rack gear 27, which will be described later, and a difference in dimensions of a spacing between the first opposing wall portion 15 and the second opposing wall portion 17 and a spacing between the first opposed wall portion 19 and the second opposed wall portion 21. The first opposing wall portion 15 and the first opposed wall portion 19 face each other with a predetermined spacing and are adjacent to the second opposing wall portion 17 and the second opposed wall portion 21, respectively. The rotation and extension/retraction joint mechanism 11 includes the first rack gear 23 provided for the first opposed wall portion 19 and extending along the second virtual center line 7, a first rack sector 25 having a plurality of cogs 25a to be engaged with the first rack gear 23, which is slidably supported by the first opposing wall portion 15 so that the first rack sector 25 rolls on the first rack gear 23 and also slides along the first virtual center line 3, a second rack gear 27 provided at the second opposing wall portion 17 and extending along the first virtual center line 3, and a second sector gear 29 having a plurality of cogs 29a to be engaged with the second rack gear 27, which is slidably supported by the second opposed wall portion 21 so that second sector gear 29 rolls on the second rack gear 27 and also slides along the second virtual center line 7. The first rack gear 23 is formed to extend linearly along the second virtual center line 7 and has a width that protrudes from the first opposed wall portion 19 of the second link 9 to the first opposing wall portion 15 of the first link 5. The second rack gear 27 is formed to extend linearly along the first virtual center line 3 and has a width that protrudes from the second opposing wall portion 17 of the first link 5 to the second opposed wall portion 21 of the second link 9. The cogs 23a and the cogs 27a are formed in the first rack gear 23 and the second rack gear 27, respectively. Incidentally, a through hole 19a is provided in the vicinity of a location of the first opposed wall portion 19 of the second link 9 where the first rack gear 23 is provided, and a through hole 17a is provided in the vicinity of a location of the second opposing wall portion 17 of the first link 5 where the second rack gear 27 is provided. Originally, these through holes need not to be provided. However, presence of these through holes 19a and 17a allows lighter weight of the rotation and extension/retraction link mechanism. Further, maintenance on the gears such as lubrication of lubricating oil becomes thereby facilitated.

The through hole 19b is formed at a position substantially parallel to the first rack gear 23 and above the first rack gear 23 so that the through hole 19b linearly extends. Due to the presence of this through hole 19b, a common shaft 37, which will be described later, can move along the second virtual center line 7 and can pass through the first opposed wall portion 19.

The first sector gear 25 and the second sector gear 29 have substantially the same sector shape, and the cogs 25a and 29a are formed in arc portions of the sector shapes, respectively. On the first sector gear 25 and the second sector gear 29, sliding projecting portions 25b and 29b to be slidably fixed into sliding recess portions 15a and 21a of the first opposing wall portion 15 and the second opposing wall portion 17, respectively, which will be described later, are integrally formed. As described above, the first sector gear 25 slidably supported by the first opposing wall portion 15 of the first link 5 rolls on the first rack gear 23 formed to be integral with the first opposed wall portion 19 of the second link 9 through the cogs 25a. The second sector gear 29 slidably supported by the second opposed wall portion 21 of the second link 9 rolls on the second rack gear 27 formed to be integral with the second opposing wall portion 17 of the first link 5 through the cogs 29a. Stiffness can be thereby given to movements of the first link 5 and the second link 9.

In this embodiment shown in FIG. 1, a protrusion 25b is disposed at a side of the first sector gear 25 which faces the first opposing wall portion 15 of the first link 5, along the first virtual center line 3. A protrusion 29b is disposed at a side of the second sector gear 29 which faces the second opposed wall portion 21 of the second link 9, along the second virtual center line 7. Then, the elongated through hole 15a is formed in the first opposing wall portion 15 of the first link 5 along the first virtual center line 3. The elongated through hole 21a is formed in the second opposed wall portion 21 of the second link 9 along the second virtual center line 7. The protrusions 25b and 29b are slidably fit into these through holes 15a and 21a as the sliding projecting portions of the present invention. Dimensions of each protrusions 25b and 29b become smaller than dimensions of each of the through holes 15a and 21a. In the embodiment described above, the protrusions 25b and 29b are formed on the first sector gear 25 and the second sector gear 29, respectively, and the through holes 15a and 21a are formed in the first opposing wall portion 15 and the second opposed wall portion 21, respectively. However, the protrusions as the sliding projecting portions may be of course formed on the first opposing wall portion 15 and the second opposed wall portion 21, respectively, and the through holes as the sliding recess portions may be of course formed in the first sector gear 25 and the second sector gear 29, respectively. In this embodiment, the through holes 15a and 21a are employed as the sliding recess portions of the present invention. However, the sliding recess portions may be the ones that can make the protrusions 25b and 29b to be slidably fit thereinto. Accordingly, the through holes 15a and 21a may pass through the first opposing wall portion 15 and the second opposed wall portion 21, respectively, or not. In this embodiment, the protrusions 25b and 29b are slidably fit into the through holes 15a and 21a, respectively. The first link 5 can thereby make an extension/retraction movement relative to the second link 9. By adding a rotation movement to this, a rotation movement and extension/retraction mechanism of the rotation extension/retraction link mechanism of the present invention can be realized.

In this embodiment, shapes and sizes of the first rack gear 23 and the first sector gear 25 and a positional relationship therebetween, and shapes and sizes of the second rack gear 27 and the second sector gear 29 and a positional relationship therebetween are determined under a following condition. That is, as viewed in projection perpendicular to a virtual plane 31 in which the first virtual center line 3 and the second virtual line 7 are both present, as shown in FIG. 1, a relative rotation amount and a relative rotation direction of the first sector gear 25 relative to the first rack gear 23 are defined as RQ1 and RD1, respectively. A relative rotation amount and a relative rotation direction of the second sector gear 29 to the second rack gear 27 are defined as RQ2 and RD2, respectively. In this condition, the rotation amount RQ1 becomes equal to the rotation amount RQ2, and the rotation direction RD1 becomes opposite to the rotation direction RD2. Further, when a sliding amount and a sliding direction of the first sector gear 25 along the first virtual center line 3 are defined as SQ1 and SD1, respectively, and when a sliding amount and a sliding direction of the second sector gear 29 along the second virtual center line 7 are defined as SQ2 and SD2, respectively, the sliding amount SQ1 becomes equal to the sliding amount SQ2, and the sliding direction SD1 becomes relatively opposite to the sliding direction SD2. That is, a portion where the first rack gear 23 is engaged with the first sector gear 25 becomes substantially as long as a portion where the second rack gear 27 is engaged with the second sector gear 29. Herein, the virtual plane 31 in which the first virtual center line 3 and the second virtual center line 7 are both present means the virtual plane in which the first virtual center line 3 and the second virtual center line 7 can be present in a mutually-crossed state. When the shapes and the sizes of the first rack gear 23 and the first sector gear 25 and the positional relationship therebetween and the shapes and the sizes of the second rack gear 27 and the second sector gear 29 and the positional relationship therebetween are determined as described above, a rolling movement and an extension/retraction movement of the second link 9 relative to the first link 5 can be uniquely determined.

Figure 4:
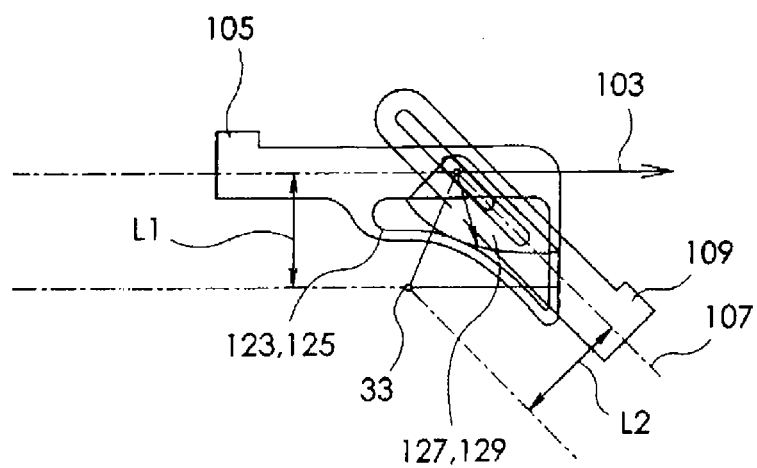
FIG. 4 is a diagram schematically showing a configuration of a rotation and extension/retraction link mechanism according to other embodiment of the present invention.

FIG. 4 is a drawing schematically showing a configuration of a rotation and extension/retraction link mechanism according to other embodiment of the present invention. Referring to this drawing, reference numerals adding 100 to reference numerals shown in FIGS. 1 and 3 are assigned to components common to those in the embodiment shown in FIGS. 1 and 3. Shapes and sizes of a first rack gear 123 and a first sector gear 125 and a positional relationship therebetween and shapes and sizes of a second rack gear 127 and a second sector gear 129, and a positional relationship therebetween are determined so that a minimum distance L1 between a center of rotation 33 of a second virtual center line 107 and a first virtual center line 103 and a minimum distance L2 between the center of rotation and the second virtual center line 107 are always completely constant. The center of rotation 33 is defined in the virtual plane when the second virtual center line 107 relatively rotates with respect to the first virtual center line 103. As a movement of an object on a plane can be regarded as a rotation movement about the certain point, the center of rotation 33 means the certain point when. Accordingly, when a minimum distance between the second virtual center line and the certain point is constant during a movement of the second virtual center line 107, it means that the second virtual center line 107 makes the rotation movement using the certain point as the center of rotation. In this case, radiuses of the first rack gear 123 and the second rack gear 127 are reduced more substantially in a left direction of the drawing, and are also curved in the form of convex substantially in an upper direction of the drawing. Radiuses of the first sector gear 125 and the second sector gear 129 are reduced more move substantially in a left direction of the drawing, and are also curved in the form of convex substantially in a lower direction of the drawing. Referring to FIG. 4, though a plurality of cogs of the first rack gear 123 and the second rack gear 127 and a plurality of cogs of the first sector gear 125 and the second sector gear 129 are omitted in the drawing, a portion in which the first rack gear 123 is engaged with the first sector gear 125 is substantially as long as a portion in which the second rack gear 127 is engaged with the second sector gear 129. According to the embodiment of the present invention, an ideal rotation and extension/retraction link mechanism can be realized.

The embodiment of the present invention shown in FIG. 1 further includes a driving force applying mechanism 35 which generates at least one driving force among a driving force that causes the first sector gear 25 to roll relative to the first rack gear 23, a driving force that causes the first sector gear 25 to linearly move along the first virtual center line 3, a driving force that causes the second sector gear 29 to roll relative to the second rack gear 27, and a driving force that causes the second sector gear 29 to linearly move along the second virtual center line 7. This driving force applying mechanism 35 is provided to drive the rotation and extension/retraction link mechanism 1. This embodiment includes a common shaft 37 with an axis line thereof located at an intersection between the first virtual center line 3 and the second virtual center line 7, which vertically extends with respect to the virtual plane 31 and rotatably passes through the first sector gear 25 and the second sector gear 29, a driving rope 41 which passes over a pulley 39 supported by the common shaft 37 and extends both along the first virtual center line 3 and the second virtual center line 7, a rope winding device 43 which winds up the driving rope 41, and a rope tension generating mechanism 45 which adjustably generates tension of the driving rope 41. The pulley 39 is the pulley over which the driving rope 41 is wound and rotates about the common shaft 37. Though a wire rope is employed as the driving rope 41, any material may be of course employed if the rope is the one with a high strength. The rope winding device 43 and the rope tension generating mechanism 45 use a motor as a driving source not particularly shown as a driving source. The driving source is not limited to the motor. A leading end of the driving rope 41 pulled out from the rope winding device 43 is fixed to one of the first link 5 and the second link 9. Tension is given to the driving rope 41 by being wound up by the rope winding device 43 and by the rope tension output generating mechanism 45. The driving force that causes the first sector gear 25 to linearly move along the first virtual center line 3 and the driving force that causes the second sector gear 29 to linearly move along the second virtual center line 7 can be thereby both generated.

In the driving force applying mechanism 35 including the rope tension generating mechanism 45 described above, the driving rope 41 cannot be pulled out unless an external force works. Then, a return mechanism which always generates a force for relatively rotating the first virtual center line 3 and the second virtual center line 7 is provided between the first link 5 and the second link 9. In this embodiment, a spring 47 is employed as the return mechanism. When the spring 47 is employed as described above, the driving force applying mechanism 35 can give tension necessary for winding up or pulling out the driving rope 41 to the driving rope 41, and can further prevent a deflection of the driving rope 41. Accordingly, rigidity can be given to the rotation and extension/retraction link mechanism.

This embodiment is configured so that the second link 9 is located between the first opposing wall portion 15 and the second opposing wall portion 17. That is, the first opposed wall portion 19 and the second opposed wall portion 21 of the second link 9 are arranged at a predetermined spacing, and the first link 5 and the second link 9 are combined to alternate with each other in such a manner that the first opposing wall portion 15, first opposed wall portion 19, second opposed wall portion 21, and second opposing wall portion 17 are arranged sequentially. With this arrangement, the rotation and extension/retraction link mechanism can be formed with a small number of components and also compactly. As a result, reduction in size and cost of the rotation and extension/retraction link mechanism can be effected.

A combination of cases where the first opposed wall portion 19 and the second opposed wall portion 21 of the second link 9 are arranged at the predetermined spacing and the first link 5 is assembled with the second link 9 is not limited to the above-mentioned example. The first opposing wall portion 15, first opposed wall portion 19, second opposing wall portion 17, and the second opposed wall portion 21 may be arranged in order to achieve the alternation. Even with the combination described above, the rotation and extension/retraction link mechanism can be formed with a small number of components and also compactly.

Incidentally, though not particularly shown, in this embodiment, at least one of the first opposing wall portion 15 and the second opposing wall portion 17 of the first link 5, and the first opposed wall portion 19 and the second opposed wall portion 21 of the second link 9, is constructed so that a length thereof in a direction of the corresponding virtual center line can be mechanically adjusted. As a method of the mechanical adjustment, the first link 5 and the second link 9 can be constituted from two divided links connected through a sliding mechanism which allows the two divided links to slide in directions of the first virtual center line 3 and the second virtual center line 7, and a fixing structure for fixing the two divided links and the sliding mechanism. As the fixing structure, a screw member or the like can be employed. When the length of the link can be mechanically adjusted as described above, the length of the link can be set according to an application. Accordingly, a need for preparing a lot of types of the links is eliminated, so that general versatility is enhanced. Further, there is a method or the like in which, by fixing a screw member within each of the through holes 15a and 21a, sliding distances of the protrusions 25b and 29b within the through holes 15a and 21a are limited. With this arrangement, even when a movable range of the rotation and extension/retraction link mechanism is to be adjusted, there is no need for replacing a component therein.

Figure 5:
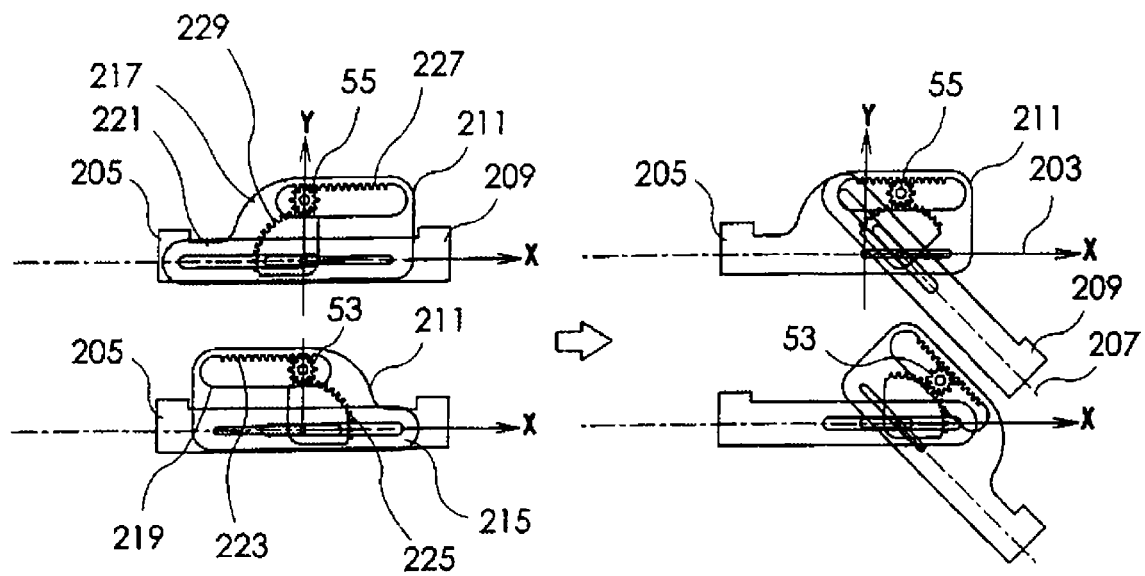
FIG. 5 is a plan view showing a still other embodiment of the present invention and a driven state thereof.

FIG. 5 shows a plan view showing still other embodiment of the present invention and a driven state thereof. Referring to this drawing, reference numerals adding 200 to the reference numerals shown in FIGS. 1 and 3 are assigned to components common to those in the embodiment shown in FIGS. 1 and 3. A rotation and extension/retraction joint mechanism 211 includes a first rack gear 223 provided at a wall 219 and extending along a second virtual center line 207, a first sector gear 225 slidably supported by a wall 215 so that the first sector gear 225 slides along a first virtual center line 203, a first reversing gear 53 located between the first rack gear 223 and the first sector gear 225, which is engaged with both of the gears, for rotation, a second rack gear 227 provided at a second opposing wall portion 217 and extending along the first virtual center line 3, a second sector gear 229 slidably supported by the second opposed wall portion 221 so that the second sector gear 229 slides along the second virtual center line 207, and a second reversing gear 55 located between the second rack gear 227 and the second sector gear 229, which is engaged with both of the gears, for rotation. Compared with the embodiment shown in FIGS. 1 and 3, in this embodiment, the first link 205, second link 209, first rack gear 223, second rack gear 227, first sector gear 225, and second sector gear 229 are formed in reversed states of the first link 5, second link 9, first rack gear 23, second rack gear 27, first sector gear 25, and second sector gear 29 in the embodiment shown in FIGS. 1 and 3. Then, the first reversing gear 53 is formed to be sandwiched between the first rack gear 223 and the first sector gear 225, thereby being engaged with both of the gears. The second reversing gear 55 is formed to be sandwiched between the second rack gear 227 and the second sector gear 229, thereby being engaged with both of the gears. When the first rack gear 223 is formed to be directly engaged with the first sector gear 225 and when the second rack gear 227 is formed to be directly engaged with the second sector gear 229, the second link 209 will rotate upward relative to the first link 205. Accordingly, the first reversing gear 53 and the second reversing gear 55 are adopted so as to make the second link 209 rotate downward relative to the first link 205. By adopting the rotation and extension/retraction link mechanism that uses the first reversing gear 53 and the second reversing gear 55 as described above, the first rack gear 223, second rack gear 227, first sector gear 225, and second sector gear 229 can be greatly separated from the center of rotation of the second virtual center line 207 relative to the first virtual center line 203. A larger space in the vicinity of the center of rotation can be thereby obtained.

In this embodiment, shapes and sizes of the first rack gear 223, first sector gear 225, and reversing gear 53 and a positional relationship thereamong and shapes and sizes of the second rack gear 227, second sector gear 229, and second reversing gear 55 and a positional relationship thereamong are determined so that as viewed in projection perpendicular to a virtual plane in which the first virtual center line 203 and the second virtual line 207 are both present, a relative rotation amount RQ 201 of the first sector gear 225 relative to the first rack gear 223 becomes equal to a relative rotation amount RQ202 of the second sector gear 229 relative to the second rack gear 227, and a relative rotation direction RD201 of the first sector gear 225 relative to the first rack gear 223 becomes opposite to a relative rotation direction RD202 of the second sector gear 229 relative to the second rack gear 227. Then, the shapes, sizes, and the positional relationships are determined so that a sliding amount SQ201 of the first sector gear 225 along the first virtual center line 203 becomes equal to a sliding amount SQ202 of the second sector gear 229 along the second virtual center line 7 and a sliding direction SD201 of the first sector gear 225 along the first virtual center line 203 becomes relatively opposite to a sliding direction SD202 of the second sector gear 229 along the second virtual center line 207. When the shapes and the sizes of the first rack gear 223, first sector gear 225, and reversing gear 53 and the positional relationship thereamong and the shapes and the sizes of the second rack gear 227, the second sector gear 229, and second reversing gear 55 and the positional relationship thereamong are determined as described above, a rolling movement and an extension/retraction movement of the second link 209 relative to the first link 205 can be uniquely determined even if the configuration using the first reversing gear 53 and the second reversing gear 55 is employed.

This embodiment can further include a driving force applying mechanism 235 that generates at least one driving force among a driving force that causes the first reversing gear 53 and the first sector gear 225 to roll relative to the first rack gear 223, a driving force that causes the first sector gear 225 to linearly move along the first virtual center line 3, a driving force that causes the second reversing gear 55 and the second sector gear 229 to roll relative to the second rack gear 227, and a driving force that causes the second sector gear 229 to linearly move along the second virtual center line 7. With this arrangement, even when the first reversing gear 53 and the second reversing gear 55 are used, the rotation and extension/retraction link mechanism can be driven.

Figure 6:
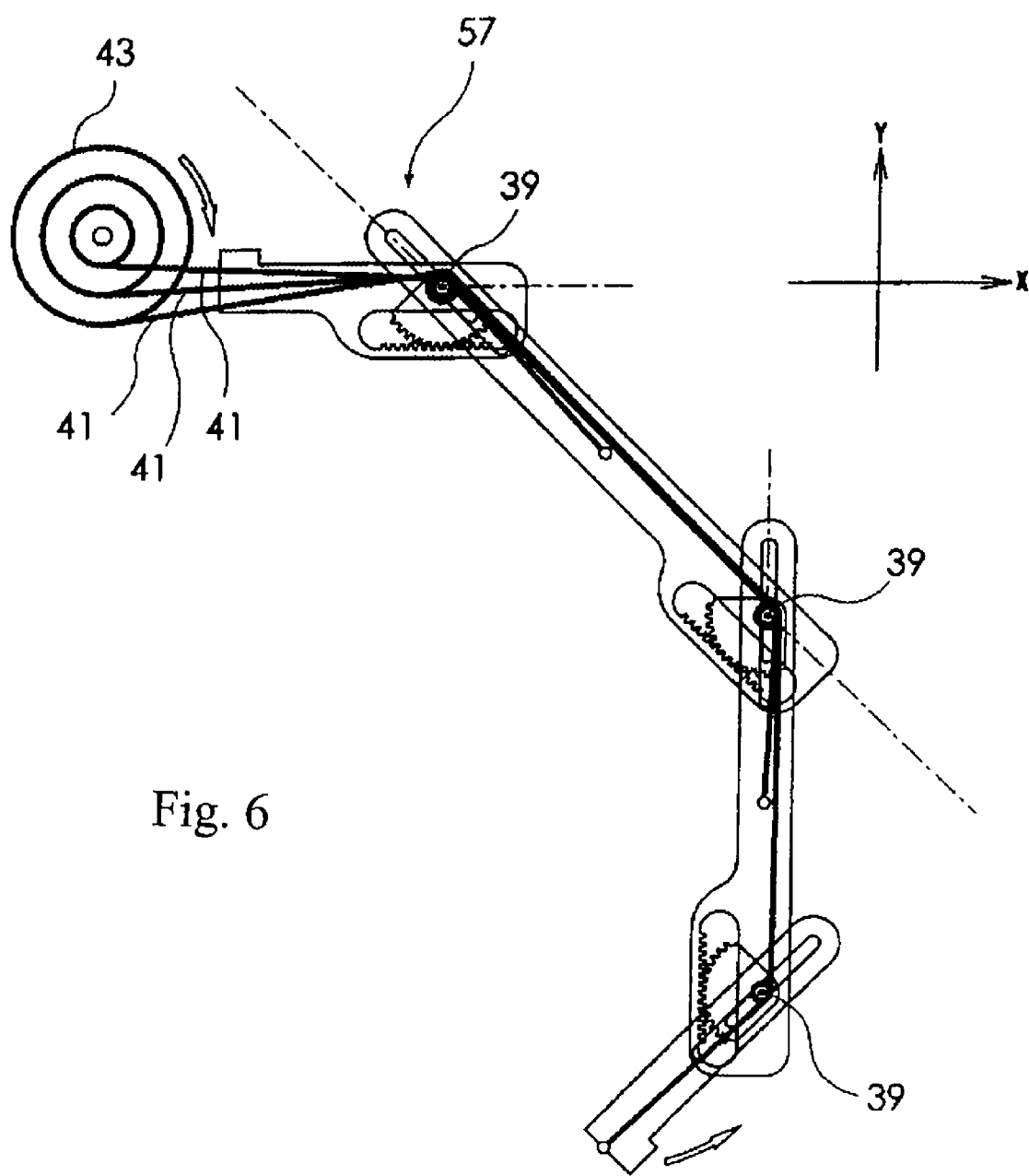
FIG. 6 is a plan view showing an embodiment when a plurality of the rotation and extension/retraction link mechanisms are combined.

FIG. 6 is a plan view showing an embodiment when a plurality of the rotation and extension/retraction link mechanisms are assembled. In this embodiment, by connecting three rotation and extension/retraction link mechanisms in series, a serial multi-joint mechanism 57 is formed. The number of the rotation and extension/retraction link mechanisms to be connected may be any number as necessary. When the serial multi-joint mechanism 57 is formed by assembling the rotation and extension/retraction link mechanisms as described above, a complex movement can be achieved.

The embodiment about this serial multi-joint mechanism is configured so that the driving ropes 41 added for driving the three rotation and extension/retraction joint mechanisms are pulled around through the pulleys 39 within all the other rotation and extension/retraction joint mechanisms that are present between the rope winding device 43 which winds up or unwinds the driving rope 41 and the rope tension output generating mechanism 45 and one of the rotation and extension/retraction joint mechanisms. With this arrangement, all of the rope winding device 43 that winds up or unwinds the driving rope and the rope tension output generating mechanism 45 can be disposed on a base that makes no movement. Reduction of a mass of a portion of the serial multi-joint mechanism that makes a movement therefore becomes facilitated.

Figure 7:
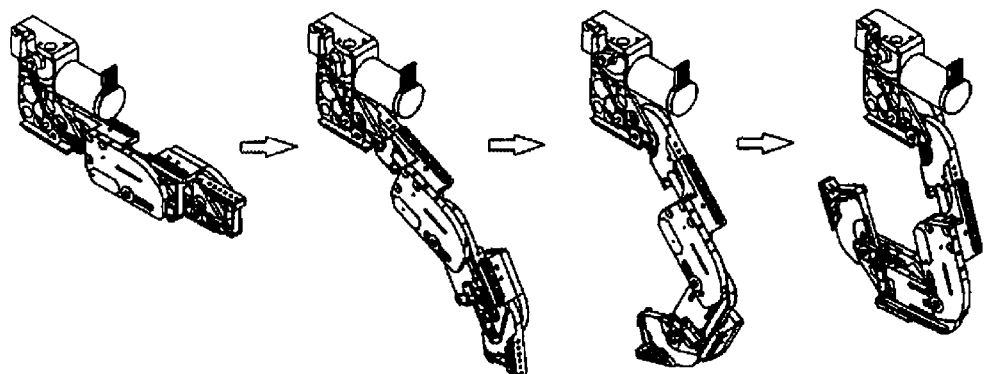
FIG. 7 is a perspective view showing a structure when the embodiment of the present invention is commercialized in a specific form.
Figure 8:
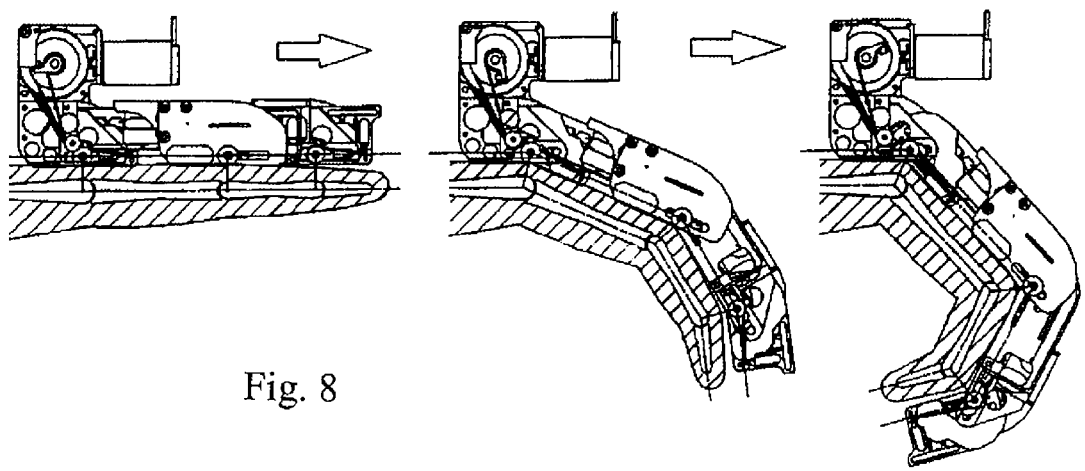
FIG. 8 is a diagram showing a structure when the embodiment of the present invention is commercialized in a specific form.
Figure 9:
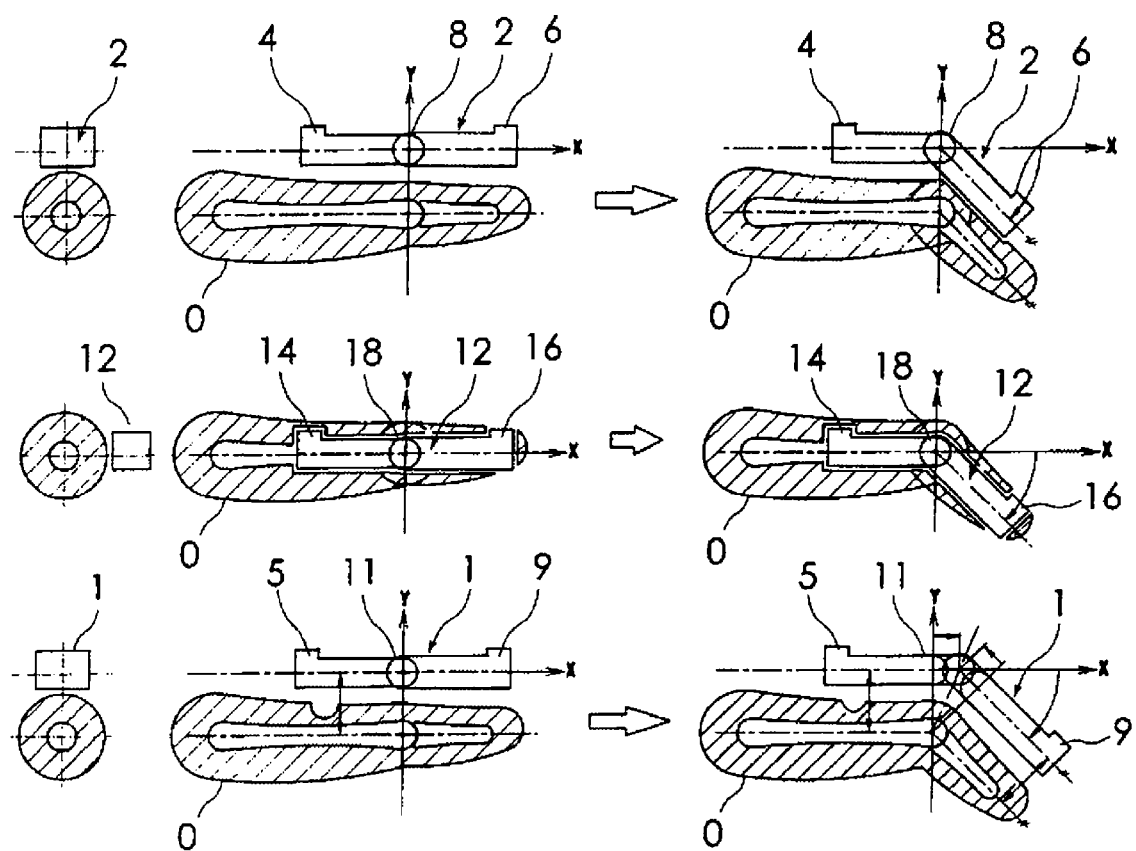
FIG. 9 shows schematic diagrams illustrating a prior art of the present invention and a schematic diagram illustrating the embodiment of the present invention.

FIG. 7 is a perspective view showing a structure when this embodiment is commercialized in a specific form, and FIG. 8 is a diagram showing a state where the structure in FIG. 7 is applied to a human body.

The above description was given about the embodiments of the present invention. Characteristics of the inventions other than the inventions set forth in claims will be listed below.

[1] A rotation and extension/retraction link mechanism having first through nth (n being a positive integer) links connected in series through first through (n−1)th rotation and extension/retraction joint mechanisms, the first through nth links being arranged linearly in a state where respective virtual center lines for the first through nth links entirely overlapping with one another in a linear form, the first through (n−1)th rotation and extension/retraction joint mechanisms being configured so that when the virtual center line for a subsequent stage of the links rotates relative to the virtual center line for a preceding stage of the links from a state where the virtual center line for the preceding stage entirely overlaps with the virtual center line for the subsequent stage, an intersection between the virtual center line for the preceding stage and the virtual center line for the subsequent stage is displaced on the virtual center line for the preceding stage, wherein the preceding stage of the links includes first and second opposing wall portions facing each other with a predetermined spacing;

the subsequent stage of the links includes a first opposed wall portion facing the first opposing wall portion and a second opposed wall portion facing the second opposing portion; and each of the rotation and extension/retraction joint mechanisms includes a first rack gear provided at the first opposed wall portion and extending along the virtual center line for the subsequent stage; a first sector gear including a plurality of cogs to be engaged with the first rack gear, the first sector gear being slidably supported by the first opposing wall portion so that the first sector gear rolls on the first rack gear and slides along the virtual center line for the preceding stage; a second rack gear provided at the second opposing wall portion and extending along the virtual center line for the preceding stage; and a second sector gear including a plurality of cogs to be engaged with the second rack gear, the second sector gear being slidably supported by the second opposed wall portion so that the second sector gear rolls on the second rack gear and slides along the virtual center line for the subsequent stage.

[2] The rotation and extension/retraction link mechanism according to the above-mentioned characteristic [1], wherein a positional relationship between the first rack gear and the first sector gear, a positional relationship between the second rack gear and the second sector gear, a positional relationship between the first rack gear and the second sector gear, and a positional relationship between the first sector gear and the second sector gear are determined so that a relative rotation direction of the first sector gear relative to the first rack gear becomes opposite to a relative rotation direction of the second sector gear relative to the second rack gear and a sliding direction of the first sector gear along the virtual center line for the preceding stage becomes relatively opposite to a sliding direction of the second sector gear along the virtual center line for the subsequent stage.

[3] The rotation and extension/retraction link mechanism according to the above-mentioned characteristic [2], wherein the positional relationship between the first rack gear and the first sector gear and the positional relationship between the second rack gear and the second sector gear are determined so that centers of rotation of the first and second sector gears are located more outward than a center of rotation of an intersection between the virtual center line for the preceding stage and the virtual center line for the subsequent stage.

[4] The rotation and extension/retraction link mechanism according to the above-mentioned characteristic [1], further including a driving force applying mechanism which imparts to the second sector gears a driving force that causes the second sector gears of the first through (n−1)th rotation and extension/retraction joint mechanisms to rotate relative to the second rack gears, respectively, in synchronization.

[5] The rotation and extension/retraction link mechanism according to the above-mentioned characteristics [1] through [4], wherein the rotation and extension/retraction link mechanism is configured to be arranged in a more radially outward direction than centers of rotations of a plurality of joints of a skeleton such as a finger or the like, thereby deforming according to a movement of the skeleton; and shapes of the first and second rack gears and shapes of the first and second sector gears are determined so that a center of rotation of an intersection between the virtual center line for the preceding stage and the virtual center line for the subsequent stage substantially coincides with the centers of rotation of the joints.

INDUSTRIAL APPLICABILITY

According to the present invention, an extension/retraction movement as well as a rotation movement can be realized by the rotation and extension/retraction link mechanism including the rotation and extension/retraction joint mechanism. Accordingly, the link mechanism can realize a joint including a virtual axis of rotation in a space where no real structural member is present and a rotation movement the joint about the virtual axis of rotation.

The invention claimed is:

1. A rotation and extension/retraction link mechanism with a first link therein and a second link therein coupled through a rotation and extension/retraction joint mechanism, said first link having a first virtual center line and said second link having a second virtual center line, wherein said rotation and extension/retraction joint mechanism is constructed so that it couples said first link and said second link in such a manner that as the second virtual center line rotates relative to the first virtual center line from a state where the first virtual center line entirely overlaps with the second virtual center line, while crossing the first virtual center line, an intersection between the first virtual center line and the second virtual center line moves on the first virtual center line by a predetermined distance corresponding to an angle of the rotation;

wherein said first link includes first and second opposing wall portions facing each other at a predetermined spacing; and said second link includes a first opposed wall portion facing said first opposing wall portion and a second opposed wall portion facing said second opposing wall portion; and wherein said rotation and extension/retraction join mechanism includes;

a first rack gear provided at said first opposed wall portion and extending along the second virtual center line;

a first sector gear including a plurality of cogs to be engaged with said first rack gear, said first sector gear being slidably supported by said first opposing wall portion so that said first sector gear rolls on said first rack gear and slides along the first virtual center line;

a second rack gear provided at said second opposing wall portion and extending along the first virtual center line; and a second sector gear including a plurality of cogs to be engaged with said second rack gear, said second sector gear being slidably supported by said second opposed wall portion so that said second sector gear rolls on said second rack gear and slides along the second virtual center line.

2. The rotation and extension/retraction link mechanism according to claim 1, wherein said first rack gear and said first sector gear and a positional relationship therebetween, and said second rack gear and said second sector gear and a positional relationship therebetween are such that, as said rotation and extension/retraction link mechanism is perpendicularly projected onto a virtual plane in which the first virtual center line and said second virtual line are both present, a first relative rotation amount of said first sector gear relative to said first rack gear is equal to a second relative rotation amount of said second sector gear relative to said second rack gear, a first relative rotation direction of said first sector gear relative to said first rack gear is opposite to a second relative rotation direction of said second sector gear relative to said second rack gear, a first sliding amount of said first sector gear along the first virtual center line is equal to a second sliding amount of said second sector gear along the second virtual center line, and a first sliding direction of said first sector gear along the first virtual center line is opposite to a second sliding direction of said second sector gear along the second virtual center line.

3. The rotation and extension/retraction link mechanism according to claim 1, wherein said first rack gear and said first sector gear and a positional relationship therebetween, and said second rack gear and said second sector gear and a positional relationship therebetween are such that a minimum distance between a center of rotation of the second virtual center line and the first virtual center line and a minimum distance between said center of rotation and the second virtual center line is always substantially constant, said center of rotation being defined in said virtual plane as the second virtual center line relatively rotates with respect to the first virtual center line.

4. The rotation and extension/retraction link mechanism according to claim 1, further comprising:
a driving force applying mechanism which generates a driving force that causes said first sector gear to roll relative to said first rack gear, a driving force that causes said first sector gear to linearly move along the first virtual center line, a driving force that causes said second sector gear to roll relative to said second rack gear, or a driving force that causes said second gear to linearly move along the second virtual center line.

5. The rotation and extension/retraction link mechanism according to claim 4, wherein said driving force applying mechanism comprises:
a common shaft with an axis line thereof located at an intersection between the first virtual center line and the second virtual center line, said common shaft vertically extending with respect to said virtual plane and also rotatably passing through said first sector gear and said second sector gear;
a pulley supported by said common shaft;
a driving rope that passes over said pulley and extends both along the first virtual center line and the second virtual center line;
a rope winding device that winds up said driving rope; and
a rope tension generating mechanism that adjustably generates tension of said driving rope;
a leading end of said driving rope pulled out from said rope winding device is fixed to one of said first link and said second link; and
said driving rope is wound up by said rope winding device and the tension is given by said rope tension generating mechanism, thereby generating both the driving force that causes said first sector gear to linearly move along the first virtual center line and the driving force that causes said second sector gear to linearly move along the second virtual center line.

6. A serial multi joint mechanism comprising:
a plurality of rotation and extension/retraction link mechanisms according to claim 5 connected in series.

7. A serial multi joint mechanism comprising:
a plurality of rotation and extension/retraction link mechanisms according to claim 5 connected in series;
said driving rope being pulled around one or more pulleys within one or more of said rotation and extension/retraction joint mechanisms that are present between said rope winding device which winds up or unwinds said driving rope and said rope tension generating mechanism.

8. The rotation and extension/retraction link mechanism according to claim 5, wherein a return mechanism that always generates a force for relatively rotating the first virtual center line and the second virtual center line is further comprised between said first link and said second link.

9. The rotation and extension/retraction link mechanism according to claim 1, wherein said first and second opposed wall portions of said second link are located between said first and second opposing wall portions, respectively.

10. The rotation and extension/retraction link mechanism according to claim 1, wherein said first opposed wall portion of said second link and said second opposed wall portion of said second link are arranged at a predetermined spacing; and
said first link and said second link are combined in such a manner that said first opposing wall portion, said first opposed wall portion, said second opposed wall portion, and said second opposing wall portion are arranged in an order, where the order is:
(1) said first opposing wall portion,
(2) said first opposed wall portion,
(3) said second opposed wall portion, and
(4) said second opposing wall portion.

11. The rotation and extension/retraction link mechanism according to claim 1, wherein said first opposed wall portion of said second link and said second opposed wall portion of said second link are arranged at a predetermined spacing; and
said first link and said second link are combined in such a manner that said first opposing wall portion, said first opposed wall portion, said second opposing wall portion, and said second opposed wall portion are arranged in an order, where the order is:
(1) said first opposing wall portion,
(2) said first opposed wall portion,
(3) said second opposing wall portion, and
(4) said second opposed wall portion.

12. The rotation and extension/retraction link mechanism according to claim 1, wherein sliding projecting portions are provided at one of said first sector gear and said first opposing wall portion and one of said second sector gear and said second opposed wall portion, respectively, and sliding recess portions to be slidably fit with said sliding projecting portions are provided at the other of said first sector gear and said first opposing wall portion and the other of said second sector gear and said second opposed wall portion, respectively.

13. The rotation and extension/retraction link mechanism according to claim 1, wherein at least one of said first and second opposing wall portions of said first link and said first and second opposed wall portions of said second link are constructed so that a length thereof in a direction of the corresponding virtual center line is mechanically adjustable.

14. A rotation and extension/retraction link mechanism with a first link therein and a second link therein coupled through a rotation and extension/retraction joint mechanism, said first link having a first virtual center line and said second link having a second virtual center line,
wherein said rotation and extension/retraction joint mechanism is constructed so that it couples said first link and said second link in such a manner that as the second virtual center line rotates relative to the first virtual center line from a state where the first virtual center line entirely overlaps with the second virtual center line, while crossing the first virtual center line, an intersection between the first virtual center line and the second virtual center line moves on the first virtual center line by a predetermined distance corresponding to an angle of the rotation;
wherein said first link includes first and second opposing wall portions facing each other at a predetermined spacing; and said second link includes a first opposed wall portion facing said first opposing wall portion and a second opposed wall portion facing said second opposing wall portion; and wherein said rotation and extension/retraction join mechanism includes:

a first rack gear provided at said first opposed wall portion and extending along the second virtual center line;

a first sector gear slidably supported by said first opposing wall portion so that said first sector gear slides along the first virtual center line;

a first reversing gear located between said first rack gear and said first sector gear, said first reversing gear being engaged with both of said first rack gear and said first sector, for rotation;

a second rack gear provided at said second opposing wall portion and extending along the first virtual center line;

a second sector gear slidably supported by said second opposed wall portion so that said second sector gear slides along the second virtual center line; and a second reversing gear located between said second rack gear and said second sector gear, said second reversing gear being engaged with both of said second rack gear and said sector gear, for rotation.

15. The rotation and extension/retraction link mechanism according to claim 14, wherein said first rack gear, said first sector gear, and said first reversing gear and a positional relationship thereamong, and said second rack gear, said second sector gear, and said second reversing gear and a positional relationship thereamong are such that, as said rotation and extension/retraction link mechanism is perpendicularly projected onto a virtual plane in which the first virtual center line and said second virtual line are both present, a first relative rotation amount of said first sector gear relative to said first rack gear is equal to a second relative rotation amount of said second sector gear relative to the second rack gear, a first relative rotation direction of said first sector gear relative to said first rack gear is opposite to said second relative rotation direction of said second sector gear relative to said second rack gear, a first sliding amount of said first sector gear along the first virtual center line is equal to a second sliding amount of said second sector gear along the second virtual center line, and a first sliding direction of said first sector gear along the first virtual center line is opposite to a second sliding direction of said second sector gear along the second virtual center line.

16. The rotation and extension/retraction link mechanism according to claim 15, further comprising:

a driving force applying mechanism which generates a driving force that causes said first sector gear to roll relative to said first rack gear, a driving force that causes said first sector gear to linearly move along the first virtual center line, a driving force that causes said second sector gear to roll relative to said second rack gear, or a driving force that causes said second sector gear to linearly move along the second virtual center line.

* * * * *